United States Patent
Li

(10) Patent No.: US 12,411,849 B1
(45) Date of Patent: Sep. 9, 2025

(54) STANDARDIZING CUSTOMIZED ENTITIES IN MULTI-TENANT CLOUD SYSTEMS

(71) Applicant: SAP SE, Walldorf (DE)

(72) Inventor: Hui Li, Shanghai (CN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/659,088

(22) Filed: May 9, 2024

(51) Int. Cl.
*G06F 16/245* (2019.01)
*G06F 16/2453* (2019.01)

(52) U.S. Cl.
CPC .............................. *G06F 16/24545* (2019.01)

(58) Field of Classification Search
CPC ................................................. G06F 16/24545
USPC ......................................................... 707/719
See application file for complete search history.

(56) References Cited

U.S. PATENT DOCUMENTS

| | | |
|---|---|---|
| 8,762,366 B1 | 6/2014 | Becerra et al. |
| 9,043,362 B2 | 5/2015 | Weissman et al. |
| 10,133,775 B1 | 11/2018 | Ramalingam et al. |
| 10,534,774 B2 | 1/2020 | Obradovic et al. |
| 11,222,013 B2 | 1/2022 | De Lima et al. |
| 11,544,236 B2 | 1/2023 | Brown et al. |
| 11,579,933 B2 | 2/2023 | Chen et al. |
| 11,715,025 B2 | 8/2023 | Wen et al. |
| 2010/0082320 A1 | 4/2010 | Wood et al. |
| 2018/0336247 A1* | 11/2018 | Ignatyev ........... G06F 16/24542 |
| 2019/0324881 A1 | 10/2019 | Buffone |
| 2019/0355074 A1 | 11/2019 | Schwartz et al. |
| 2020/0320151 A1 | 10/2020 | Philips |
| 2020/0410376 A1 | 12/2020 | Zhou et al. |
| 2023/0153223 A1 | 5/2023 | Sankaranarayanan et al. |
| 2024/0062021 A1 | 2/2024 | Tangari et al. |
| 2025/0139179 A1 | 5/2025 | Yu et al. |

FOREIGN PATENT DOCUMENTS

| | | |
|---|---|---|
| CN | 111240959 | 6/2020 |
| CN | 113377521 | 9/2021 |
| WO | WO 2016084327 | 6/2016 |
| WO | WO 2019085754 | 5/2019 |
| WO | WO 2020119051 | 6/2020 |

OTHER PUBLICATIONS

U.S. Appl. No. 18/495,862, filed Oct. 27, 2023, Yu et al.
Wikipedia.org [online], "Ridge Regression" created on Mar. 2021, retrieved on May 9, 2024, retrieved from URL <https://en.wikipedia.org/wiki/Ridge_regression>, 9 pages.
Non-Final Office Action in U.S. Appl. No. 18/495,862, mailed on Nov. 18, 2024, 23 pages.

* cited by examiner

*Primary Examiner* — Baoquoc N To
(74) *Attorney, Agent, or Firm* — Fish & Richardson P.C.

(57) ABSTRACT

Methods, systems, and computer-readable storage media for receiving a customized entity definition (CED) from a tenant of a plurality of tenants, processing, by a machine learning (ML) model, the CED to generate a set of costs, and determining that all of the costs in the set of costs do not exceed respective threshold costs, and in response, generating a customized entity using the CED, and storing the customized entity in the database.

20 Claims, 4 Drawing Sheets

STANDARDIZING CUSTOMIZED ENTITIES IN MULTI-TENANT CLOUD SYSTEMS

BACKGROUND

Software systems can be provisioned by software vendors to enable enterprises to conduct operations. Software systems can include various applications that provide functionality for execution of enterprise operations. Software systems can be executed in cloud computing environments (e.g., applications provided in the so-called "Software-as-Service" (SaaS) paradigm). Cloud computing can be described as Internet-based computing that provides shared computer processing resources, and data to computers and other devices on demand.

In some instances, software systems can include applications that operate in association with a database system. Applications can be provided in an application layer that overlies a database system and enable interactions with the database system (e.g., reading data, writing data, manipulating data). Applications can be provisioned for multiple disparate enterprises, each being referred to as a tenant. For example, a database can store shared data objects that are common to all tenants (all tenants can interact with shared data objects) and tenant-specific data objects (each tenant can interact with its own tenant-specific data objects).

SUMMARY

Implementations of the present disclosure are directed to multi-tenant cloud systems. More particularly, implementations of the present disclosure are directed to standardizing customized entities in multi-tenant cloud systems.

In some implementations, actions include receiving a first customized entity definition (CED) from a first tenant of a plurality of tenants, processing, by a machine learning (ML) model, the first CED to generate a first set of costs, and determining that all of the costs in the first set of costs do not exceed respective threshold costs, and in response: generating a first customized entity using the first CED, and storing the first customized entity in the first database. Other implementations of this aspect include corresponding systems, apparatus, and computer programs, configured to perform the actions of the methods, encoded on computer storage devices.

These and other implementations can each optionally include one or more of the following features: the first set of costs includes at least one of a central processing unit (CPU) cost, a memory cost, and a network input/output (IO) cost; determining all of the costs in the first set of costs is based on a query operation on the first customized entity; the ML model includes a ridge regression model that is trained using sets of costs from historical data stored in a second database; actions further include receiving a second CED from a second tenant of a plurality of tenants, processing, by the ML model, the second CED to generate a second set of costs, and determining that at least one cost in the second set of costs exceeds a respective threshold cost, and in response, providing an alert to the second tenant, the alert including one or more recommendations to modify the second CED; actions further include receiving a modified second CED from the second tenant of a plurality of tenants, the modified second CED including a modification responsive to the one or more recommendations, processing, by the ML model, the modified second CED to generate a third set of costs, and determining that all of the costs in the third set of costs do not exceed respective threshold costs, and in response, generating a second customized entity using the modified second CED, and storing the second customized entity in the first database; and actions further include automatically redirecting a user to a customization user interface that enables the user to modify the second CED.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
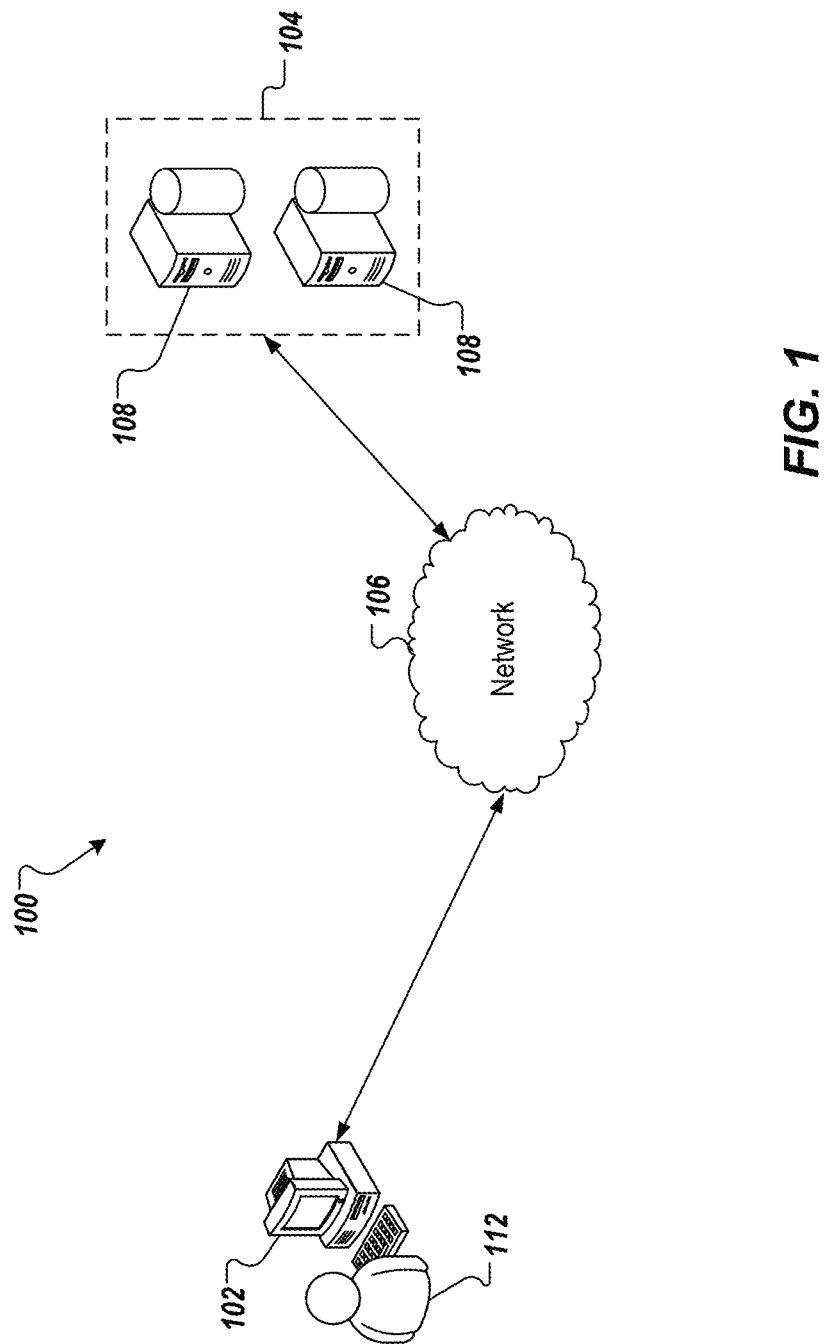
FIG. 1 depicts an example architecture that can be used to execute implementations of the present disclosure.

Implementations of the present disclosure are directed to multi-tenant cloud systems. More particularly, implementations of the present disclosure are directed to standardizing customized entities in multi-tenant cloud systems. Implementations can include actions of receiving a customized entity definition (CED) from a tenant of a plurality of tenants, processing, by a machine learning (ML) model, the CED to generate a set of costs, and determining that all of the costs in the set of costs do not exceed respective threshold costs, and in response, generating a customized entity using the CED, and storing the customized entity in the database.

To provide further context for implementations of the present disclosure, and as introduced above, software systems can include applications that operate in association with a database system. An application can be provided in an application layer that overlies a database system and enables interactions with the database system (e.g., reading data, writing data, manipulating data). Applications can be provisioned for multiple disparate enterprises, each being referred to as a tenant. Such software systems can be referred to as multi-tenant systems. As such, a database, for example, can store shared entities (also referred to as shared data objects) that are common to all tenants. That is, all tenants can interact with shared entities. In multi-tenant systems, shared entities are predefined and deployed to the multi-tenant system by the software vendor. Such shared entities are bound to database tables and data models that are shared by all tenants.

However, different tenants have different requirements in their use of a software system. In view of this, a database, for example, can store tenant-specific entities (also referred to as tenant-specific data objects), where each tenant can interact with its own tenant-specific entities. The tenant-specific entities enable the database system to meet the particular requirements of respective tenants. To this end, customization functionality can be provided in multi-tenant systems to enable tenants to create customized entities that meet tenant-specific needs. Such customized entities can be bound to shared database tables and data models, for example, as well as tenant-specific database tables and data models.

In cloud computing environments, many tenants share the same hardware resources and software resources, such as processing (central processing units (CPUs)), memory, network bandwidth, and the like. Customized entities, also referred to as tenant-specific entities, can have different impacts on different resources of the multi-tenant system. For example, a tenant-specific entity can consume more resources and place a heavier burden on the multi-tenant system than another tenant-specific entity. If the tenant-specific entit-y/-ies of a tenant consume too many resources or even exhaust resources, all other tenants will also be impacted. For example, operations of the other tenants on a database system can be slowed or even prevented.

In view of the above context, implementations of the present disclosure provide a standardization system for standardizing definitions of customized entities to improve efficiencies in consumption of technical resources and protect cloud computing systems. More particularly, the standardization system of the present disclosure generates a machine learning (ML) model that predicts a set of costs for a customized entity definition submitted by a tenant. In some examples, if a cost in the set of costs exceeds a respective threshold cost, the customized entity definition is rejected, and the tenant is advised to modify the customized entity definition. In some examples, if all costs in the set of costs do not exceed respective threshold costs, a customized entity (tenant-specific data object) is created in a database using the customized entity definition. In some examples, the set of costs can represent an operation of a set of operations that could be executed on the customized entity, if deployed to the database system.

In accordance with implementations of the present disclosure, standardization is from the perspective of consumption of technical resources when operating on customized entities, ensuring that operations on customized entities do not exceed respective thresholds. In this manner, imbalanced loads across tenants is avoided. As described herein, standardization is achieved in that, if it is determined that a customized entity would consume too many technical resources, corresponding recommendations for modification are provided (e.g., reduce the number of property or navigation, reduce page size) and implemented to ensure that all customized entities meet a standard of resource consumption (e.g., less than respective thresholds).

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In some implementations, the server system 104 can host a standardization system for standardizing definitions of customized entities in accordance with implementations of the present disclosure. For example, the server system 104 can host a software system that includes an application and a database, the application enabling operations to be executed on entities (data objects) stored within the database. In some examples, the standardization system can process customized entity definitions created by tenants before creating customized entities to the database using the customized entity definitions. As described in further detail herein, a cost prediction model (ML model) predicts a set of costs for a customized entity definition submitted by a tenant. In some examples, if a cost in the set of costs exceeds a respective threshold cost, the customized entity definition is rejected, and the tenant is advised to modify the customized entity definition. In some examples, if no cost in the set of costs exceeds the respective threshold cost, a customized entity (tenant-specific data object) is created in a database using the customized entity definition.

Figure 2:
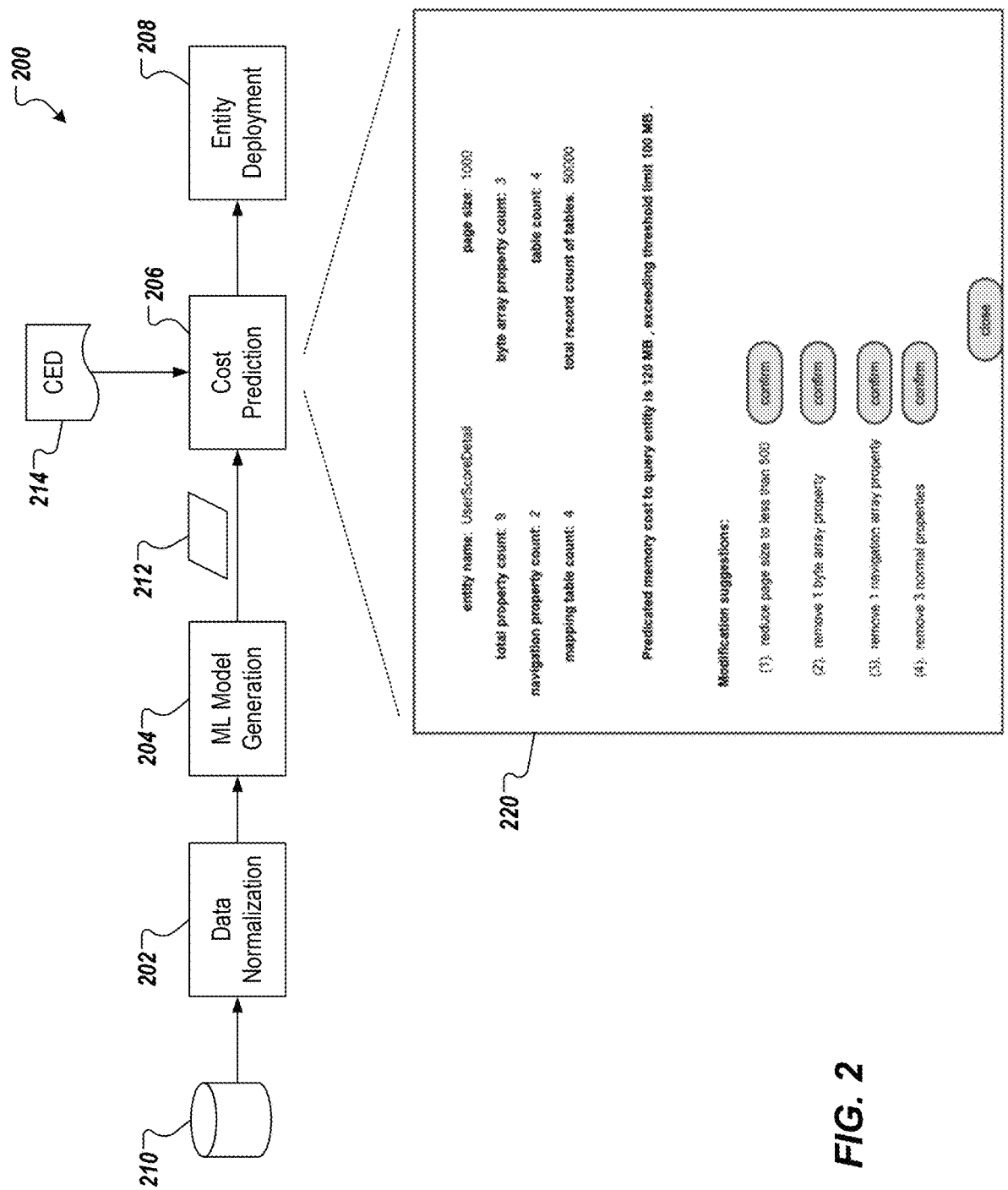
FIG. 2 depicts an example conceptual architecture in accordance with implementations of the present disclosure.

FIG. 2 depicts an example architecture 200 in accordance with implementations of the present disclosure. In the depicted example, the example architecture 200 includes a data normalization module 202, a ML model generation module 204, a cost prediction module 206, and an entity deployment module 208. As described in further detail herein, historical data that is stored in a datastore 210 is processed to generate a cost prediction model 212. A customized entity definition (CED) 214 is processed by the cost prediction model 212 to determine a set of costs that can be used to determine whether to deploy a customized entity to a database system using the customized entity definition 214.

In further detail, historical data is stored in the datastore 210 and is representative of processing of requests to a database system, the requests including queries that act on entities stored in the database system. In some examples, the historical data includes feature variables of entities implicated by the requests. Example feature variables are provided in Table 1.

TABLE 1

Example Feature Variables of Entities

| Feature Variable | Description |
| --- | --- |
| $CT_{prop}$ | Total property count of entity. |
| $CT_{bytes}$ | Byte array property count of entity. |
| $CT_{navi}$ | Navigation property count of entity. |
| $CT_{table}$ | Table count that the entity maps to. |
| $CT_{record}$ | The total record count of the mapping tables. |
| $PS$ | Page size to query the entity. |

In some examples, the byte array property count maps to columns of binary large objects (BLOBs)/character large objects (CLOBs) of one or more database tables. In some examples, the navigation property count represents links of the entity to one or more other entities. In some examples, the table count represents a number of tables that the entity maps to (e.g., multiple tables using a JOIN clause in a standard query language (SQL) query). In some examples, the total record count represents the number of records in the mapping tables.

In some implementations, the historical data includes a set of performance metrics for each request, each performance metric representing a respective resource cost (consumption of the respective resource). Example resource costs can include CPU time cost (e.g., CPU time spent processing the request), memory cost (e.g., memory consumed in processing the request), and network input/output (IO) cost (e.g., network bandwidth consumed in processing the request). In some examples, the historical data is representative of real-world requests submitted to the database system during production use of the database system to operate on entities stored in the database system (e.g., shared entities, tenant-specific entities). Sets of performance metrics are provided from execution of the requests and stored in the datastore 210. In some examples, dummy entities can be stored in the database system and non-production requests (e.g., test requests) can be processed to generate sets of performance metrics that can be stored in the datastore 210. In some examples, the dummy entities can be provided using relatively complex definitions of, for example and without limitation, feature variables of property count, navigation property count, byte array property count, table count, table record count, and/or page size.

In some implementations, the data normalization module 202 receives historical data from the datastore 210. For example, the historical data can be divided (e.g., randomly divided) into multiple sets. For purposes of non-limiting illustration, the historical data can be divided into a training set, a validation set, and a testing set (e.g., 50% as the training set, 25% as the validation set, and 25% as the testing set). The data normalization module 202 normalizes values of feature variables in the historical data. For example, values of feature variables in the training set can be normalized. In some examples, normalizing a value can include modifying the value to be within a range of 0 and 1, inclusive (e.g., [0, 1]). Values (v) of feature variables can be normalized using the following example relationship:

$$v_{normalized} = \frac{v - \min(v)}{\max(v) - \min(v)} \quad (1)$$

Here, the functions min(v) and max(v) represent determining the minimum value and the maximum value, respectively, of a feature variable in the training set.

In accordance with implementations of the present disclosure, the ML model generation module 204 processes the normalized historical data of the training set to provide the cost prediction model. As introduced above, the cost prediction model predicts a set of costs for each customized entity definition submitted by tenants.

In further detail, in response to a request, operations can be executed on an entity. Example operations include create, query, edit, and delete. The operations of create, edit, and delete generally impact individual records of an entity and have a relatively low consumption of technical resources to execute. However, the operation of query frequently relates to multiple records across multiple entities and has a relatively high consumption of technical resources. In view of this, and as described in further detail herein, the cost prediction model is generated based on the operation of query.

More particularly, the cost prediction model can be provided as a regression model. In some examples, the cost prediction model can be generated using ridge regression over the historical data (the normalized historical data of the training set). Here, ridge regression can be used to estimate coefficients of the cost prediction model and mitigate overfitting of the cost prediction model.

In training the cost prediction model, values of feature variables can be provided as a vector having the form:

$$x = [1, CT_{prop}, CT_{bytes}, CT_{navi}, CT_{table}, CT_{record}, PS] \quad (2)$$

Regression coefficients, which represent the impact factors for CPU time cost, memory cost, and network IO cost to query an entity, can be provided as respective vectors having the following forms:

$$a = [a_0, a_1, a_2, a_3, a_4, a_5, a_6]^T \quad (3)$$

$$b = [b_0, b_1, b_2, b_3, b_4, b_5, b_6]^T \quad (4)$$

$$c = [c_0, c_1, c_2, c_3, c_4, c_5, c_6]^T \quad (5)$$

where T means transpose of the vector or matrix.

The following example relationships can be used to calculate CPU time cost, memory cost, and network IO cost, respectively:

$$C_{cpu} = a^T x^T = \quad (6)$$
$$a_0 + a_1 CT_{prop} + a_2 CT_{bytes} + a_3 CT_{navi} + a_4 CT_{table} + a_5 CT_{record} + a_6 PS$$

$$C_{mem} = b^T x^T = \quad (7)$$
$$b_0 + b_1 CT_{prop} + b_2 CT_{bytes} + b_3 CT_{navi} + b_4 CT_{table} + b_5 CT_{record} + b_6 PS$$

$$C_{net} = c^T x^T = \qquad (8)$$
$$c_0 + c_1 CT_{prop} + c_2 CT_{bytes} + c_3 CT_{navi} + c_4 CT_{table} + c_5 CT_{record} + c_6 PS$$

Table 2 represents m records in the historical data:

TABLE 2

Example Historical Data (Normalized in Testing Set)
Historical Data $[CT_{prop}{}^{(1)}, CT_{bytes}{}^{(1)}, CT_{navi}{}^{(1)}, CT_{table}{}^{(1)}, CT_{record}{}^{(1)}, PS^{(1)}, C_{cpu}{}^{(1)}, C_{mem}{}^{(1)}, C_{net}{}^{(1)}]$
$[CT_{prop}{}^{(2)}, CT_{bytes}{}^{(2)}, CT_{navi}{}^{(2)}, CT_{table}{}^{(2)}, CT_{record}{}^{(2)}, PS^{(2)}, C_{cpu}{}^{(2)}, C_{mem}{}^{(2)}, C_{net}{}^{(2)}]$
...
$CT_{prop}{}^{(m)}, CT_{bytes}{}^{(m)}, CT_{navi}{}^{(m)}, CT_{table}{}^{(m)}, CT_{record}{}^{(m)}, PS^{(m)}, C_{cpu}{}^{(m)}, C_{mem}{}^{(m)}, C_{net}{}^{(m)}$ A matrix and vectors for the m records can be provided as:

$$X = \begin{bmatrix} 1 & CT_{prop}^{(1)} & CT_{bytes}^{(1)} & CT_{navi}^{(1)} & CT_{table}^{(1)} & CT_{record}^{(1)} & PS^{(1)} \\ 1 & CT_{prop}^{(2)} & CT_{bytes}^{(2)} & CT_{navi}^{(2)} & CT_{table}^{(2)} & CT_{record}^{(2)} & PS^{(2)} \\ \cdots & \cdots & \cdots & \cdots & \cdots & \cdots & \cdots \\ 1 & CT_{prop}^{(m)} & CT_{bytes}^{(m)} & CT_{navi}^{(m)} & CT_{table}^{(m)} & CT_{record}^{(m)} & PS^{(m)} \end{bmatrix} \qquad (9)$$

$$= \begin{bmatrix} x^{(1)} \\ x^{(2)} \\ \cdots \\ x^{(m)} \end{bmatrix}$$

$$y_{cpu} = \left[ C_{cpu}^{(1)}, C_{cpu}^{(2)}, \ldots, C_{cpu}^{(m)} \right]^T \qquad (10)$$

$$y_{mem} = \left[ C_{mem}^{(1)}, C_{mem}^{(2)}, \ldots, C_{mem}^{(m)} \right]^T \qquad (11)$$

$$y_{net} = \left[ C_{net}^{(1)}, C_{net}^{(2)}, \ldots, C_{net}^{(m)} \right]^T \qquad (12)$$

Regression coefficients of ridge regression can be calculated using the following example relationships:

$$a = \left(X^T X + \lambda_a I\right)^{-1} X^T y_{cpu} \qquad (13)$$

$$b = \left(X^T X + \lambda_b I\right)^{-1} X^T y_{mem} \qquad (14)$$

$$c = \left(X^T X + \lambda_c I\right)^{-1} X^T y_{net} \qquad (15)$$

where I is the identity matrix, which is a square matrix with ones on the main diagonal and zeros elsewhere, $\lambda_a$, $\lambda_b$, and $\lambda_c$ are the ridge parameters of the ridge regression for regularization, and $\lambda_a \geq 0$, $\lambda_b \geq 0$, $\lambda_c \geq 0$. If $\lambda_a = 0$, $\lambda_b = 0$, $\lambda_c = 0$, the ridge regression model reduces to the ordinary least square method.

During training of the cost prediction model, the most matchable values of regression coefficients a, b, and c are calculated using Equations 13-15, respectively, using the training set. In training, the ridge parameters can be set as $\lambda_a = 0$, $\lambda_b = 0$, $\lambda_c = 0$, that is to say, using the least square method. To train the cost prediction model, the (normalized) records of the testing set are input to the cost prediction model to determine, for each record, a set of predicted costs. For each set of predicted costs, predicted costs are compared to actual costs provided in the respective record. In some examples, comparison is performed by calculating a mean squire error (MSE) and a coefficient of determination ($R^2$) based on the predicted costs and the actual costs. If the MSE and the $R^2$ on the testing set indicate that the cost prediction model is underfitting or overfitting, the ridge parameters $\lambda_a$, $\lambda_b$, and $\lambda_c$ are adjusted and another iteration is done. Iterations of training are repeated until the MSE and the $R^2$ on the testing set indicate that underfitting/overfitting of the cost prediction model are absent. After training, the cost prediction model is provided as Equations 6-8 using the regression coefficients determined during training.

In some implementations, values of feature variables of the validation set are calculated using Equation 1. To validate the cost prediction model, the (normalized) records of the validation set are input to the cost prediction model to determine, for each record, a set of predicted costs. For each set of predicted costs, predicted costs are compared to actual costs provided in the respective record. In some examples, comparison is performed by calculating the MSE and the $R^2$ based on the predicted costs and the actual costs. If the MSE and the $R^2$ on the validation set indicate that the cost prediction model is underfitting or overfitting, the ridge parameters $\lambda_a$, $\lambda_b$, and $\lambda_c$ are adjusted to mitigate underfitting/overfitting.

After one or more adjustments and achieving values of the MSE and the $R^2$ that indicate absence of underfitting/overfitting, the cost prediction model is tested using the testing set. If the result of the final test is not acceptable, further refinement of the cost prediction model is performed based on the training set and the validation set. If the result of testing indicates acceptable accuracy of the cost prediction model in predicting costs, the prediction model is deployed for production use. For example, and referring again to FIG. 2, the cost prediction model 212 is deployed to the cost prediction module 206 for production use.

With continued reference to FIG. 2, the cost prediction module 206 received customized entity definitions, such as the CED 214 of FIG. 2, from tenants. For example, a tenant can use a customization user interface (UI) (e.g., provided by the software vendor for the software system) to create a CED for a customized entity (a tenant-specific entity) that the tenant seeks to create in the database. An example CED is provided in Listing 1:

```
<entity   name="UserScoreDetail"   pageSize="1000"
   owner="tenant1">
   <mappingTables>
      <table name="USER" primary="true"/>
      <table name="SCORE" primary="false"/>
      <table name="ATTACHMENT" primary="false"/>
      <table name="PICTURE" primary="false"/>
   </mappingTables>
   <properties>
      <property name="userId" type="int">
         <column name="USER_ID" table="USER"/>
      </property>
      <property name="name" type="string">
         <column name="NAME" table="USER"/>
      </property>
      <property name="department" type="string">
```

```
            <column            name="DEPARTMENT"
                table="USER"/>
        </property>
        <property name="scoreValue" type="int">
            <column            name="SCORE_VALUE"
                table="SCORE"            joinType="inner"
                joinCondition="USER.ID=SCORE.USER_
                ID"/>
        </property>
        <property name="rank" type="int">
            <column    name="RANK"    table="SCORE"
                joinType="inner"
                joinCondition="USER.ID=SCORE.USER_
                ID"/>
        </property>
        <property name="resume" type="byteArray">
            <column              name="RESUME"
                table="ATTACHMENT"        joinType="left"
                joinCondition="USER.USER_ID=ATTACH-
                MENT.USER_ID"/>
        </property>
        <property name="profilePic" type="byteArray">
            <column            name="PROFILE_PIC"
                table="PICTURE"          joinType="left"
                joinCondition="USER.USER_ID=PICTURE.
                USER_ID"/>
        </property>
        <property name="scorePic" type="byteArray">
            <column            name="SCORE_PIC"
                table="PICTURE"          joinType="left"
                joinCondition="USER.USER_ID=SCORE.
                USER_ID                               and
                SCORE.ID=PICTURE.SCORE_ID"/>
        </property>
        <property   name="manager"   type="navigation"
            navigationEntity="User"
            navigationType="One2One">
            <column            name="MANAGER_ID"
                table="USER"/>
        </property>
        <property   name="staffs"    type="navigation"
            navigationEntity="Staff"
            navigationType="One2Many">
            <column name="STAFF_IDS" table="USER"/>
        </property>
    </properties>
</entity>
```
Listing 1: Example Customized Entity Definition Example feature variables of the customized entity definition of Listing 1 can include:

The entity contains nine properties. $CT_{prop}=9$

Three properties are the type of byte array. $CT_{bytes}=3$

Two properties are navigations to other entities (User and Staff). $CT_{navi}=2$ The entity is mapping four tables. $CT_{table}=4$ $CT_{record}$ is the total record count of the mapping tables (USER, SCORE, ATTACHMENT, PICTURE)

The page size to query the entity is 1000. PS=1000

The cost prediction module 206 receives the CED 214 and processes the CED 214 through the cost prediction model 212 to determine a set of costs. For example, the set of costs includes $C_{cpu}$, $C_{mem}$, and $C_{net}$. In some implementations, each cost is compared to a respective threshold cost (e.g., $t_{cpu}$, $t_{mem}$, $t_{net}$) In some examples, if a cost in the set of costs exceeds a respective threshold cost, the CED 214 is rejected. That is, if a customized entity were to be deployed to the database using the CED 214, the customized entity would consume too many technical resources.

In some examples, the tenant is advised to modify the CED 214. For example, one or more recommendations can be provided that indicate modifications that can be used to reduce consumption of technical resources. In some implementations, the customized entity definition can be modified by reducing the value of one or more $CT_{prop}$, $CT_{bytes}$, $CT_{navi}$, and PS, for example, and an updated set of costs can be determined. If the costs in the updated set of costs are less than the respective thresholds, the reduced value(s) can be provided as recommendations to the tenant. If any cost in the updated set of costs exceeds the respective threshold, the customized entity definition can again be modified by reducing the value of one or more $CT_{prop}$, $CT_{bytes}$, $CT_{navi}$, and PS, for example, and repeating the process.

To illustrate this, a user can be automatically redirected to a customization user interface that enables the user to modify the CED. For example, and with continued reference to FIG. 2, an alert 220 can be returned to the tenant, the alert 220 including values of feature variables of the CED 214 and can indicate the cost(s) that exceeded the cost threshold (s). In the example of FIG. 2, the alert 220 provides recommendations of modifications that can be made to the CED 214 to improve its costs. For example, and based on the example of Listing 1, recommendations include reducing the page size to less than 500, removing 1 byte array property, removing 1 navigation array property, and removing 3 normal properties. In this example, the recommendations can be automatically determined (e.g., by the cost prediction module 206) by modifying the CED 214 to reduce the value of one or more $CT_{prop}$, $CT_{bytes}$, $CT_{navi}$, and PS, for example, provide an updated set of costs and compare the costs to the respective thresholds. This can be performed until no cost exceeds its respective threshold and the reduced value(s) can be provided as the recommendation(s).

The tenant can modify the CED 214 to provide a modified CED that can again be processed in accordance with implementations of the present disclosure. For example, the tenant can select a modification suggestion (recommendation) in the alert 220 (e.g., select the confirm button), and in response, a customization UI that was used to generate the CED 214 can be displayed with a portion of the customization UI highlighted. The portion of the customization UI can correspond to the feature variable that is to be modified. For example, if the tenant confirms the modification suggestion to reduce the page size, the page size definition UI element is highlighted in the customization UI. In this non-limiting example, the tenant can modify the page size of the CED 214 and submit the (modified) CED 214 for processing.

In some implementations, if all costs in the set of costs do not exceed the respective threshold costs, a customized entity (tenant-specific data object) can be created in a database using the CED 214. In some examples, the cost prediction module 206 provides the CED 214 to the entity deployment module 208, which creates a customized entity in the database based on the CED 214. For example, if none of the costs in the set of costs determined for the CED 214 exceeds its respective threshold cost, the cost prediction module 206 provides the CED 214 to the entity deployment module 208 to provide a customized entity in the database.

In some examples, a customized entity is created in the database by accepting the metadata (of the CED 214) defining the customized entity and storing the metadata in the database. For example, in the example of Listing 1, the metadata (e.g., provided in extensible markup language (XML)) defining the customized entity of UserScoreDetail is stored in the database. When a query is submitted to query records of UserScoreDetail, the metadata of UserScoreDetail is read to determine its definition. Using the definition of UserScoreDetail, columns (USER_ID, NAME, DEPARTMENT, SCORE_VALUE, RANK, RESUME, PROFILE_PIC, SCORE_PIC, MANAGER_ID, STAFF_IDS) of tables (USER, SCORE, ATTACHMENT, PICTURE) of the database are queried (e.g., using SQL), and corresponding values are encapsulated into records of UserScoreDetail.

Figure 3:
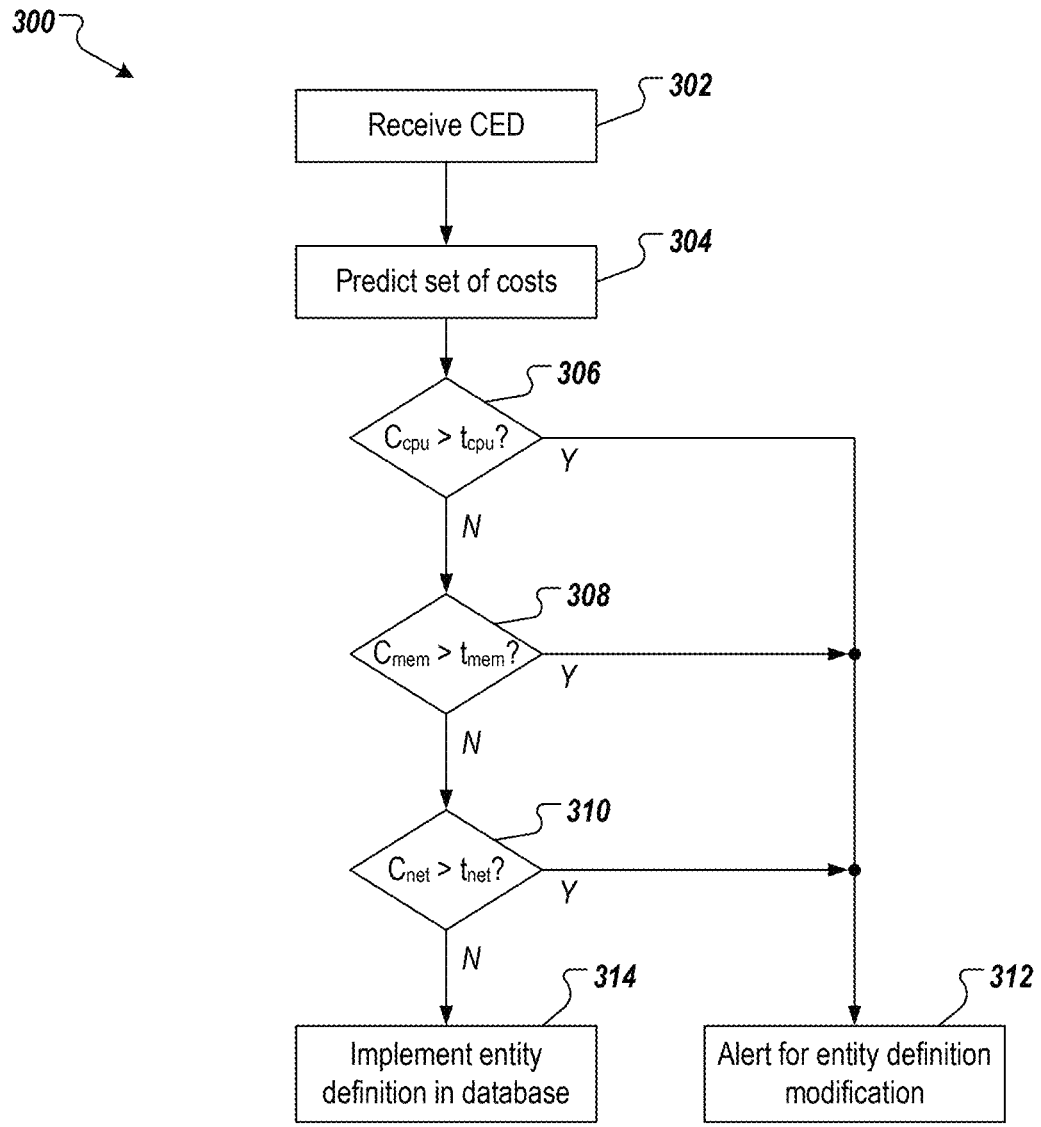
FIG. 3 depicts an example process that can be executed in accordance with implementations of the present disclosure.

FIG. 3 depicts an example process 300 that can be executed in accordance with implementations of the present disclosure. In some examples, the example process 300 is provided using one or more computer-executable programs executed by one or more computing devices.

A customized entity definition is received (302). For example, and as described herein with reference to FIG. 2, a tenant can create the CED 214 using a customization UI and the CED 214 can be received by the cost prediction module 206. A set of costs is predicted (304). For example, and as described herein, the cost prediction module 206 processes the CED 214 using the cost prediction model 212 to determine a set of costs for the CED 214. The $C_{cpu}$ is compared to $t_{cpu}$ (306), the $C_{mem}$ is compared to $t_{mem}$ (308), and the $C_{net}$ is compared to $t_{net}$ (310). If any of the costs exceeds its respective threshold, the customized entity definition is rejected and an alert is provided to the tenant (312). For example, and as described herein, the alert 220 can be provided to the tenant. If each cost is less than its respective threshold, a customized entity can be created using the customized entity definition (314). For example, and as described herein, the entity deployment module 208 can create a customized entity in a database using the CED 214.

Figure 4:
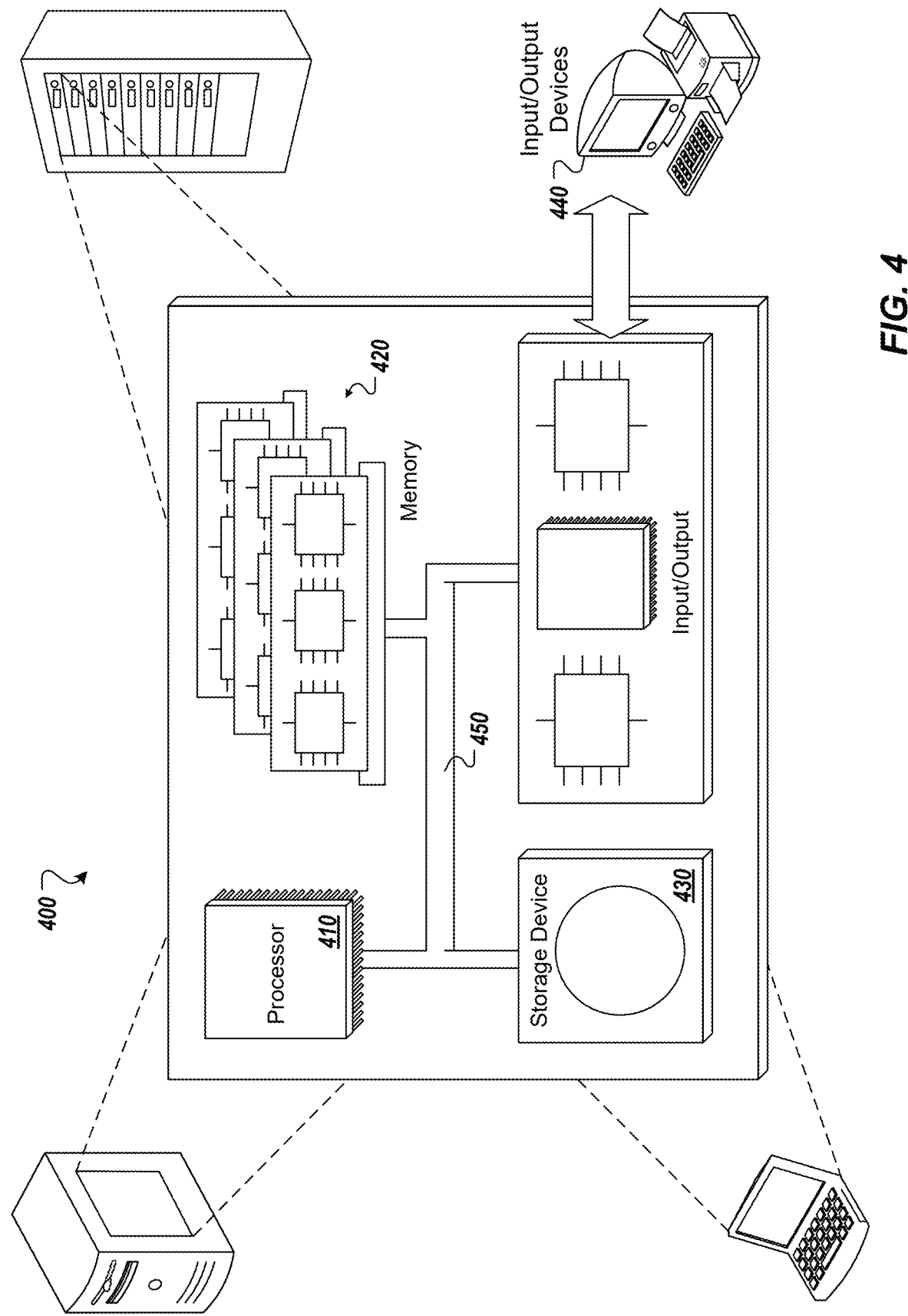
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. The components 410, 420, 430, 440 are interconnected using a system bus 450. The processor 410 is capable of processing instructions for execution within the system 400. In some implementations, the processor 410 is a single-threaded processor. In some implementations, the processor 410 is a multi-threaded processor. The processor 410 is capable of processing instructions stored in the memory 420 or on the storage device 430 to display graphical information for a user interface on the input/output device 440.

The memory 420 stores information within the system 400. In some implementations, the memory 420 is a computer-readable medium. In some implementations, the memory 420 is a volatile memory unit. In some implementations, the memory 420 is a non-volatile memory unit. The storage device 430 is capable of providing mass storage for the system 400. In some implementations, the storage device 430 is a computer-readable medium. In some implementations, the storage device 430 may be a floppy disk device, a hard disk device, an optical disk device, or a tape device. The input/output device 440 provides input/output operations for the system 400. In some implementations, the input/output device 440 includes a keyboard and/or pointing device. In some implementations, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

The invention claimed is:

1. A computer-implemented method for selectively creating customized entities in a first database, the method being executed by one or more processors and comprising:
receiving a first customized entity definition (CED) from a first tenant of a plurality of tenants, the first CED providing a first definition for one or more tenant-specific data objects for the first tenant that can be created and stored within the first database;
processing, by a machine learning (ML) model, the first CED to generate a first set of costs; and
determining that all of the costs in the first set of costs do not exceed respective threshold costs, and in response:
generating a first customized entity using the first CED, the first customized entity comprising a first tenant-specific data object, and
storing the first customized entity in the first database.

2. The method of claim 1, wherein the first set of costs comprises at least one of a central processing unit (CPU) cost, a memory cost, and a network input/output (IO) cost.

3. The method of claim 1, wherein the determining all of the costs in the first set of costs is based on a query operation on the first customized entity.

4. The method of claim 1, wherein the ML model comprises a ridge regression model that is trained using sets of costs from historical data stored in a second database.

5. The method of claim 1, further comprising:
receiving a second CED from a second tenant of a plurality of tenants, the second CED providing a second definition for one or more tenant-specific data objects for the second tenant that can be created and stored within the first database;
processing, by the ML model, the second CED to generate a second set of costs; and
determining that at least one cost in the second set of costs exceeds a respective threshold cost, and in response:
providing an alert to the second tenant, the alert comprising a first recommendation to modify the second CED.

6. The method of claim 5, further comprising:
automatically redirecting a user to a customization user interface that enables the user to modify the second CED to create a modified second CED.

7. The method of claim 6, further comprising:
receiving the modified second CED from the second tenant of a plurality of tenants, the modified second CED comprising a first modification responsive to the first recommendation;
processing, by the ML model, the modified second CED to generate a third set of costs; and
determining that all of the costs in the third set of costs do not exceed respective threshold costs, and in response:
generating a second customized entity using the modified second CED, the second customized entity comprising a second tenant-specific data object, and
storing the second customized entity in the first database.

8. The method of claim 6, wherein the alert further comprises an additional, second recommendation different from the first recommendation and the method further comprises:
receiving the modified second CED from the second tenant of a plurality of tenants, the modified second CED comprising a second modification responsive to the second recommendation;
processing, by the ML model, the modified second CED to generate a third set of costs; and
determining that all of the costs in the third set of costs do not exceed respective threshold costs, and in response:
generating a second customized entity using the modified second CED, and
storing the second customized entity in the first database.

9. A non-transitory computer-readable storage medium coupled to one or more processors and having instructions stored thereon which, when executed by the one or more processors, cause the one or more processors to perform operations for selectively creating customized entities in a database, the operations comprising:
receiving a first customized entity definition (CED) from a first tenant of a plurality of tenants, the first CED providing a first definition for one or more tenant-specific data objects for the first tenant that can be created and stored within the first database;
processing, by a machine learning (ML) model, the first CED to generate a first set of costs; and
determining that all of the costs in the first set of costs do not exceed respective threshold costs, and in response:
generating a first customized entity using the first CED, the first customized entity comprising a first tenant-specific data object, and
storing the first customized entity in the first database.

10. The non-transitory computer-readable storage medium of claim 9, wherein the first set of costs comprises at least one of a central processing unit (CPU) cost, a memory cost, and a network input/output (IO) cost.

11. The non-transitory computer-readable storage medium of claim 9, wherein the determining all of the costs in the first set of costs is based on a query operation on the first customized entity.

12. The non-transitory computer-readable storage medium of claim 9, wherein the ML model comprises a ridge regression model that is trained using sets of costs from historical data stored in a second database.

13. The non-transitory computer-readable storage medium of claim 9, wherein operations further comprise:
receiving a second CED from a second tenant of a plurality of tenants, the second CED providing a second definition for one or more tenant-specific data objects for the second tenant that can be created and stored within the first database;
processing, by the ML model, the second CED to generate a second set of costs; and determining that at least one cost in the second set of costs exceeds a respective threshold cost, and in response:
    providing an alert to the second tenant, the alert comprising a first recommendation to modify the second CED.

14. The non-transitory computer-readable storage medium of claim 13, wherein the alert further comprises an additional, second recommendation different from the first recommendation and operations further comprise:
    receiving a modified second CED from the second tenant of a plurality of tenants, the modified second CED comprising a first modification responsive to the second recommendation;
    processing, by the ML model, the modified second CED to generate a third set of costs; and
    determining that all of the costs in the third set of costs do not exceed respective threshold costs, and in response:
        generating a second customized entity using the modified second CED, the second customized entity comprising a second tenant-specific data object, and
        storing the second customized entity in the first database.

15. The non-transitory computer-readable storage medium of claim 14, wherein operations further comprise:
    automatically redirecting a user to a customization user interface that enables the user to modify the second CED to create a modified second CED.

16. A system, comprising:
    a computing device; and
    a computer-readable storage device coupled to the computing device and having instructions stored thereon which, when executed by the computing device, cause the computing device to perform operations for selectively creating customized entities in a database, the operations comprising:
        receiving a first customized entity definition (CED) from a first tenant of a plurality of tenants, the first CED providing a first definition for one or more tenant-specific data objects for the first tenant that can be created and stored within the first database;
        processing, by a machine learning (ML) model, the first CED to generate a first set of costs; and
        determining that all of the costs in the first set of costs do not exceed respective threshold costs, and in response:
            generating a first customized entity using the first CED, the first customized entity comprising a first tenant-specific data object, and
            storing the first customized entity in the first database.

17. The system of claim 16, wherein the first set of costs comprises at least one of a central processing unit (CPU) cost, a memory cost, and a network input/output (IO) cost.

18. The system of claim 16, wherein the determining all of the costs in the first set of costs is based on a query operation on the first customized entity.

19. The system of claim 16, wherein the ML model comprises a ridge regression model that is trained using sets of costs from historical data stored in a second database.

20. The system of claim 16, wherein operations further comprise:
    receiving a second CED from a second tenant of a plurality of tenants, the second CED providing a second definition for one or more tenant-specific data objects for the second tenant that can be created and stored within the first database;
    processing, by the ML model, the second CED to generate a second set of costs; and
    determining that at least one cost in the second set of costs exceeds a respective threshold cost, and in response:
        providing an alert to the second tenant, the alert comprising a first recommendation to modify the second CED.

* * * * *